Aug. 23, 1955     K. ZWICK     2,715,859
ENGRAVING AND COPYING MACHINE
Filed Feb. 3, 1951     2 Sheets-Sheet 1
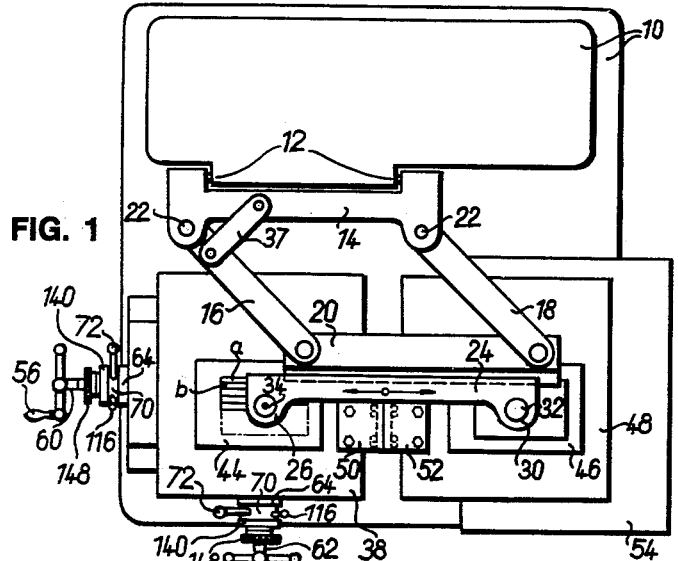
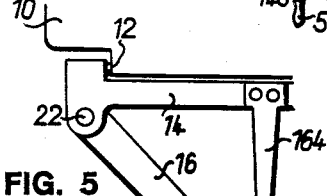
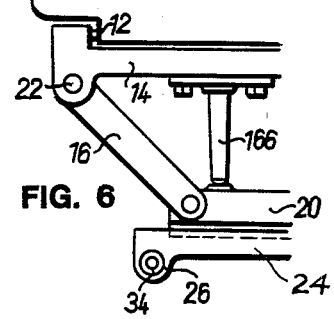
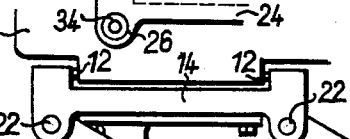
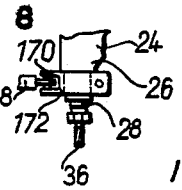
Inventor
Kurt Zwick
by Charles Shepard
Attorney Aug. 23, 1955          K. ZWICK                    2,715,859
                ENGRAVING AND COPYING MACHINE
Filed Feb. 3, 1951                          2 Sheets-Sheet 2
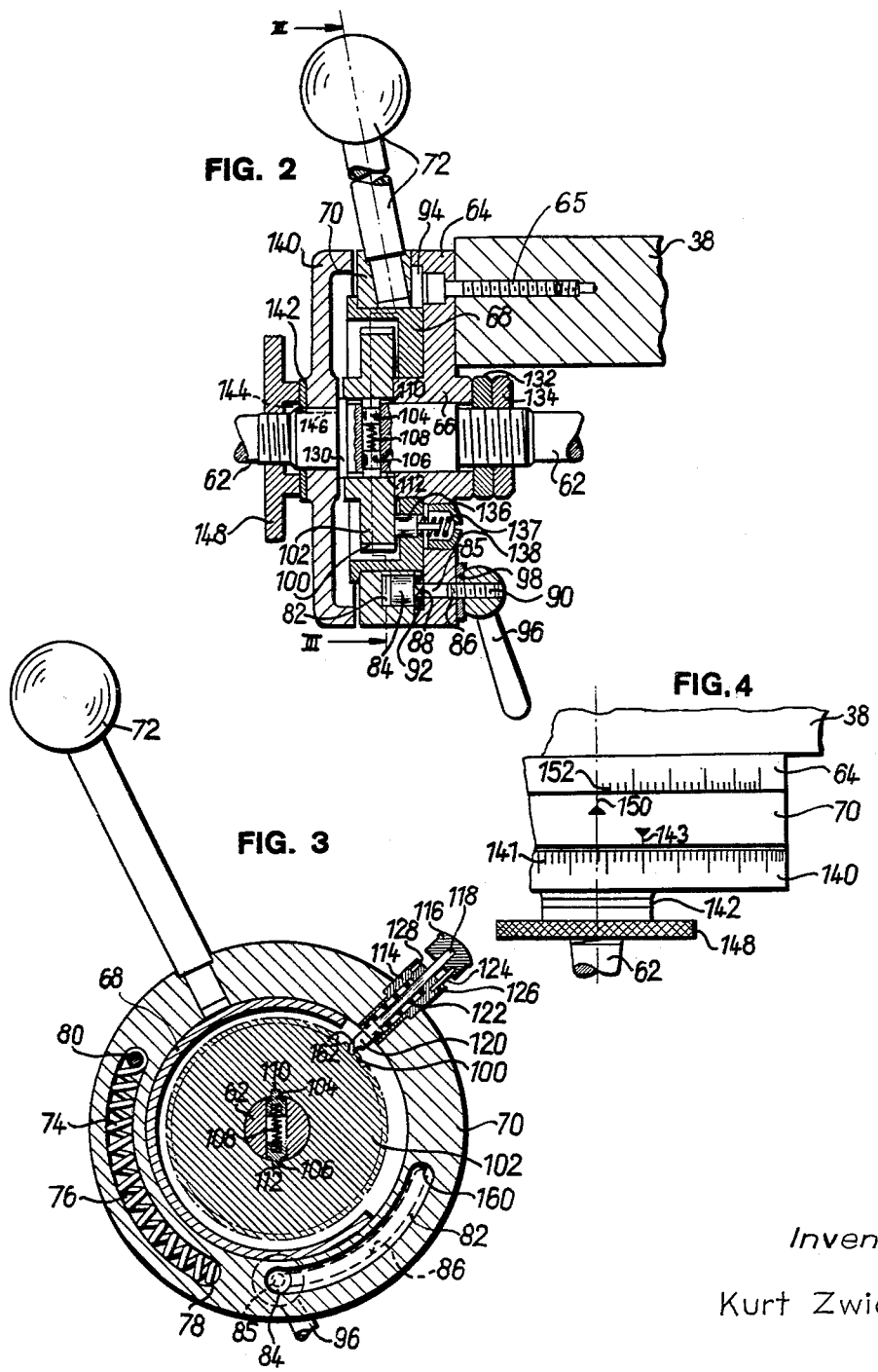
Inventor
Kurt Zwick
by Charles Shepard
Attorney

United States Patent Office 2,715,859
Patented Aug. 23, 1955

2,715,859

ENGRAVING AND COPYING MACHINE

Kurt Zwick, Munich, Germany, assignor to Hans Deckel and Friedrich Wilhelm Deckel, both of Munich, Germany Application February 3, 1951, Serial No. 209,225

Claims priority, application Germany February 9, 1950

8 Claims. (Cl. 90—13.1)

The present invention relates to engraving and copying machines, sometimes called profiling machines. These are machines in which an operating tool, such as a rotating milling cutter, and a tracing point or stylus, are coupled to each other so that as the tracing stylus is moved over a pattern mounted on the pattern table of the machine, the cutting tool will perform similar movements over a work piece mounted on the work table of the machine, thereby cutting or forming the work piece into the desired reproduction of the pattern.

For certain types of copying, it is desirable that the tracing stylus and the tool shall be moved back and forth along a series of straight lines which are parallel to each other and which are spaced from each other by equal distances or increments. An object of the present invention is to provide a generally improved and more satisfactory engraving and copying machine, particularly from the standpoint of facilitating the above mentioned movements of the stylus and tool along a series of successive lines spaced from each other.

Another object of the invention is the provision of simple and effective mechanism for holding the tracing stylus and the cutting tool against movement in directions lateral to the desired direction of straight line movement, without interfering with free movements along the desired straight line and without interfering with vertical movements of the stylus and the tool when necessary in following pattern parts of different elevations.

Still another object is the provision of simple and effective means for feeding the pattern and the work piece relative to the stylus and the cutting tool, through successive increments of equal but adjustable amount, in directions transverse to the desired line of operating movement of the stylus and tool, in order to assure the correct spacing of the parallel lines along which the tracing stylus and tool are to be moved on the pattern and work piece.

A further object is the provision of the transverse feeding mechanism just mentioned, in such form that it may be operated easily and accurately by a relatively unskilled person.

These and other desirable objects may be attained in the manner disclosed as an illustrative embodiment of the invention in the following description and in the accompanying drawings forming a part hereof, in which:

Fig. 1 is a plan of an engraving and copying machine in accordance with the present invention, with parts omitted for the sake of clarity;

Fig. 2 is a vertical section taken axially through the transverse feed controlling mechanism of the present invention;

Fig. 3 is a vertical section taken approximately on the line III—III of Fig. 2;

Fig. 4 is a fragmentary plan of part of the mechanism shown in Fig. 2;

Fig. 5 is a plan similar to a fragment of Fig. 1, showing a modified construction;

Fig. 6 is a view similar to Fig. 5, showing a second modification of the construction;

Fig. 7 is a view similar to Fig. 5 showing a third modification of the construction; and Fig. 8 is a fragmentary front elevation of part of the mechanism shown in Fig. 7.

The same reference numerals throughout the several views indicate the same parts.

As seen somewhat diagrammatically in Fig. 1, a typical engraving and copying machine to which the present invention may be applied, comprises, for example, a main frame or standard 10 having a vertical guideway or track 12 on which a carriage or mounting member 14 is movable upwardly and downwardly, the weight of the carriage and the parts supported from it being counterbalanced wholly or partly by a counterweight or by any other suitable means, such for example as the counterbalancing means disclosed in Zwick Patent 2,176,193, granted October 17, 1939, or in Ostler and Zwick Patent 2,178,122, granted October 31, 1939, or in Zwick Patent 2,260,157, granted October 21, 1941.

Mounted on and movable bodily vertically with this carriage or mounting member 14 are a pair of arms 16 and 18 pivoted at their forward ends, by means of vertical pivots, to the beam 20. The rear ends of the arms 16 and 18 are pivoted to the mounting member 14 by vertical pivots 22. With this arrangement, the beam 20 may move upwardly and downwardly bodily with the carriage 14, and it may also swing with the arms 16 and 18 as the latter swing on their pivots 22, but all positions of the beam 20 will be strictly parallel to each other, inasmuch as the arms 16 and 18 are parallel to each other and all four pivots are located exactly at the corners of an imaginary parallelogram. The front face of the beam 20 is provided with a horizontal track or guideway extending longitudinally of the beam, on which track or guideway there is mounted a carriage 24 normally capable of sliding longitudinally along the beam. On this carriage 24 near its opposite ends are two holders or sockets 26 and 30, respectively, the former of which is adapted to receive the usual tool holder 28 (Fig. 8) provided with a suitable tool such as the rotary milling cutter 36 driven from any suitable source of power by a belt passing over a drive pulley 34 (Fig. 1). The other socket 30 at the opposite end of the carriage 24 is adapted to receive the usual holder 32 for containing the conventional tracing point or stylus, not here illustrated as it is well understood in the art. As shown in Fig. 1, on the jointed arm 16 on the one hand, and on the slide 14 on the other hand there is attached, for instance screwed on, a connecting link 37, by means of which, according to the invention, the movement of the slide 24, which is possible transversely to the longitudinal direction of the bar 20, is prevented in two directions.

Also supported from the main frame 10 of the machine, on suitable guideways or tracks of conventional kind, is the usual work table 38 on which the work 44 may be clamped, in position to be worked upon by the tool 36. The pattern or model 46, to cooperate with the tracing stylus, may be clamped to the supplementary pattern table 48 which is supported by and movable in all horizontal directions over the main pattern table 54. This trail table 48 is connected with the work table 38 by means of two angle brackets 50 and 52 and is furthermore slidingly carried on an additional table 54 arranged on the machine post 10. The tables 38 and 54 may be independently adjusted in height by the conventional vertical adjusting mechanism operated by the usual hand wheels or cranks, and at least one of these tables may be adjusted horizontally in two directions at right angles to each other. For example, the hand crank 56 for operating the adjusting spindle 60 adjusts the table 38 horizontally leftwardly and rightwardly when viewed as in Fig. 1, while the hand crank 58 mounted on the adjusting spindle 62 adjusts the table 38 horizontally in a frontward or rearward direction at right angles to the direction imparted by the crank 56 and spindle 60.

For certain types of copying work and particularly the copying work for which the present invention is most useful, the work table 38 should be operatively connected to the supplementary pattern table 48 so that the horizontal movements imparted to the former by the cranks 56 and 58 will, in turn, be imparted to the table 48, causing the latter to move horizontally in the same direction and to exactly the same extent as the movements of the table 38. This is conveniently accomplished by the angle brackets 50 and 52 each having a horizontal leg or surface which may be removably clamped to the table 38 or 48, respectively, and each having vertical legs or surfaces which may be clamped to each other at varying heights relative to each other, depending upon the relative heights to which the tables 38 and 48 are adjusted. These angle brackets need not be further illustrated or described here as they are well known, being disclosed, for example, in the parts 123 to 129, inclusive, of Zwick Patent 2,247,462, granted July 1, 1947.

The parts thus far described are well known in the art and it is believed that further detailed description of them is unnecessary. These parts have been described merely as a typical example of the kind of engraving and copying machine with which the features of the present invention may be used. Although the described parts constitute the background for the present invention and assist in understanding the function and purposes of the present invention, the described parts do not, in themselves, constitute the present invention, and they may be widely varied without departing from the invention.

Turning now to the present invention, it is desired, for certain types of copying, to have the tool 36 move over the work 44 along successive parallel lines equally spaced from each other, as indicated diagrammatically by the series of lines *a, b*, in Fig. 1, and it is desired to prevent horizontal movement of the tool relative to the work except along these predetermined lines. To this end, the present invention provides means such as the link 37 (Fig. 1) for holding the beam 20 rigidly against horizontal movement, so that the tool 36 may move horizontally only by moving the carriage 24 longitudinally along the beam, thus insuring only rectilinear movement of the tool along a predetermined line. The link 37 is removably fixed at its ends, by bolts or screws, to the carriage 14 at a point intermediate between the pivots 22, and to an intermediate point on arm 16, thus preventing the arm 16 from swinging on its pivot 22.

For enabling the quick and easy feeding of the work table 38 successively through a series of feeding increments each of equal and predetermined magnitude, each of the feed spindles 60 and 62 is provided with step by step advancing or feeding mechanism according to the present invention, an exemplary embodiment of which mechanism is as follows:

The step by step feeding mechanism for each of the spindles 60 and 62 is identical, so a description of one will suffice for both. Referring first to Figs. 2 and 3, the spindle 62 extends rotatably through the disk-like member 64 which is fixed to the work table itself or to the table slide, as the case may be, by suitable means such as the screws 65. A hub-like portion 66 near the center of the disk 64 is internally formed to provide a bearing for the spindle 62. Supported from this hub and from the front face of the disk 64 is a somewhat cup-shaped member 68 fixed to the disk 64, and having a circular periphery or circumference forming a bearing for rotatably supporting a ring 70 mounted to turn coaxially with the spindle 62. This ring 70 has a radially extending operating handle 72 which may be conveniently grasped to turn the ring 70 on its support 68 to an extent determined by an adjustable stop described below.

A coiled compression spring 74 is received in an arcuate groove 76 in the rear face of the member 70, and constantly presses against one end 78 of the groove, while the other end of the spring is secured to a pin 80 which is fixed to the part 64 and extends into the groove 76. Thus the spring, as will be seen in Fig. 3, constantly tends to turn the ring 70 in a counterclockwise direction, while the pin 80 acts as a stop to limit the extent of possible counterclockwise turning.

The ring 70 also is provided, in another part of its rear face, with another arcuate groove 82 concentric with the spindle 62. The head 84 of an adjustable stop pin 85 extends into this groove 82. The shank of the pin 85 extends rearwardly from the head 84 through another arcuate groove 86 in the member 64, and its rear end is threaded at 90 to receive a clamping nut having an operating handle 96. A part of the shank of the stop pin 85 just to the rear of the head 84 is squared (at 88) and this squared part extends non-rotatably through a corresponding squared hole in an arcuate plate 92 mounted for sliding movement in an arcuate groove or recess 94 formed between the parts 64 and 70.

Between the nut 96 and the rear face of the member 64 there is a washer plate 98 through which the pin 85 extends. When the nut 96 is loosened on the screw threads 90, the pin 85, together with the plates 92 and 98, may be adjusted in a circumferential direction, arcuately around the axis of the spindle 62, to any desired position along the arcuate slot or groove 82 in the rotatable ring member 70. It may be clamped in the selected position by tightening the nut 96 on the threads 90, so that the nut 96 will press the washer plate 98 tightly against the rear face of the fixed member 64 and will draw the head 84 and interposed arcuate plate 92 tightly against the front face of the fixed member 64, holding the pin head 84 in fixed position to serve as a stop to contact with one end of the groove 82 to determine the extent to which the rotary ring 70 may be oscillated at each operation of the handle 72.

In front of the hub 66 and the part 68, the spindle 62 is provided with a disk 102 releasably coupled to the spindle as described below, the circumference of this disk 102 being formed all the way around the circumference with ratchet teeth 100. The coupling between the disk 102 and the spindle 62 is provided by means of two slides 104 and 106 radially movable in a diametrical bore through the spindle 62, and normally pressed apart from each other by an interposed compression spring 108. The outer ends of these slides 104 and 106 are formed as individual teeth with tapered or inclined sides, which normally fit into correspondingly tapered or inclined grooves 110 and 112 formed in the disk 102. This construction provides a normal driving connection or coupling whereby any rotary movement imparted to the disk 102 is normally transmitted to the spindle 62. But in case any unusual resistance to turning the spindle 62 is encountered, then in order to prevent breakage of the parts, the inclined sides of the grooves 110 and 112 cooperating with the correspondingly inclined sides of the teeth on the slides 104 and 106 will force these slides radially inwardly against the pressure of the spring 108, thus uncoupling the disk 102 from the spindle 62 and enabling the disk to turn without forcing the spindle 62 to turn with consequent breakage or damage to the parts.

For coupling the rotary ring 70 to the disk 102 to impart the rotary movement of the former to the latter, the ring 70 is provided with a radially extending sleeve 114 in which a pin 118 is radially movable, the pin having fixed to its outer end a convenient operating knob 116. The inner end of the pin is provided at 120 with a pawl tooth for cooperation with the ratchet teeth 100 of the disk 102, this pawl tooth having a straight driving side or face, as shown, and an oblique or non-driving side 162 opposite to the straight driving side. A spring 122 surrounding the pin 118 in the sleeve 114 constantly tends to move the pin radially inwardly into engagement with the teeth 100. The knob 116 has fixed to its underside a pin 124 parallel to the pin 118, and the outer face of the sleeve 114 is provided with two holes 126 and 128 arranged 180 degrees apart, around the axis of the pin 118, each of these holes being deep enough to receive the pin 124 and to allow the pin 118 to be pressed all the way inwardly so that its pawl end 120 cooperates with the teeth 100.

When the movements of the ring 70 and its operating handle 72 are intended to drive the spindle 62 step by step in one direction, the pin 124 is placed in the appropriate one of the holes 126 and 128, so that the pawl end 120 of the pin will engage in driving relation with the teeth 100 of the disk 102 when the ring 70 is moved in the one direction, and the sloping or non-driving side 162 of the pawl 120 will ratchet idly over the teeth 100 when the ring 70 is moved back in the reverse direction. If it is desired that the oscillating movements of the ring 70 shall drive the spindle 62 in the opposite direction, then the knob 116 of the pin 118 is lifted against the force of the spring 122 and the knob is turned through 180 degrees to place the pin 124 in the other one of the holes 126 and 128, thus reversing the direction of the sloping side 162 through 180 degrees, to cause the oscillation of the ring 70 to drive the disk 102 in the opposite direction. If it is desired to disconnect the drive between the ring 70 and the disk 102 entirely, to enable the spindle 62 to be moved at will in either direction by its crank 58, then the knob 116 is pulled outwardly and the pin 124 is placed in an intermediate position between the two holes 126 and 128, the end of the pin resting either on the outer face of the sleeve 114 or in a shallow hole or groove formed intermediate between the deep holes 126 and 128, to hold the pawl end 120 of the pin 118 completely out of operative contact with the teeth 100 of the disk 102. The forwardly projecting annular flange of the member 68 which encloses the disk 102 is, of course, cut away in that part of its circumference where the pawl 120 operates, as seen in Fig. 3.

The disk 102 is seated on the spindle 62 between the front face of the fixed hub 66 and the rear face of a collar 130 formed on the spindle 62, and is mounted between these parts with enough clearance to enable the disk to turn on the spindle if and when the normal driving connection between the disk and the spindle is rendered ineffective by inward movement of the slides 104 and 106 as a result of unusual resistance to the rotation of the spindle. Lock nuts 132 and 134 on the spindle, the former bearing against the rear face of the hub 66, enable the axial adjustment of the spindle to obtain just the right amount of play or clearance for the disk 102 between the collar 130 and the hub 66.

Friction brake means is provided to impose sufficient frictional drag on the rotation of the disk 102, so that the inclined surface 162 of the pawl 120 will ratchet properly over the teeth 100 during the return movement of the pawl, instead of carrying the teeth along with the pawl in both directions as might be the case if the disk 102 and spindle 62 were allowed to turn very freely without a frictional brake. This brake is provided by a braking member 136 pressed against the flat rear face of the disk 102 by a spring 137 which is received within a hollow screw or cap screw 138 screwed into a threaded bore into the fixed member 64. This member 136 is slidingly carried in the side of the sleeve 68. The member 138 is provided with a screw driver slot so that it may be screwed slightly into or out of the bore in the member 64, to adjust the tension of the spring 137 to obtain just the right amount of braking pressure of the brake-shoe 136 against the disk 102.

In front of the disk 102 and rotatable ring 70, a disk 140 (Figs. 2 and 4) is freely rotatable on the spindle 62 and has a cylindrical periphery provided with suitable calibrations or graduations 141 (Fig. 4) cooperating with an index mark 143 on the periphery of the ring 70. Another index mark 150 on the same ring 70 cooperates with calibrations or graduations 152 on the fixed member 64. The graduations 141 on the disk 140 preferably extend all the way around the entire circumference of this disk, whereas the graduations 152 on the member 64 need not extend any further than the range of maximum oscillatory movement of the ring 70 between its extreme positions.

A washer ring 142 just in front of the disk 140 has a radially inwardly extending projection 144 which engages in an axial slot or keyway 146 of the spindle 62, to prevent the washer ring 142 from turning on the spindle while allowing it to move axially thereon. In front of this washer ring 142 is a lock nut 148 threaded on the spindle 62, and having an outer surface which is knurled for convenient grasping by the hand. By loosening the nut 148, the graduated disk 140 may be freed to turn it to any desired starting position for cooperation with the index 143 on the ring 70. Then the nut 148 is tightened, so that the disk 140 is pressed tightly against the collar 130 on the spindle and is, in effect, fixed to the spindle 62 to turn therewith. Thus the total extent of turning of the spindle, from the starting position, may be read by comparing the graduations 141 with the index mark 143. Similarly, the extent of each increment of feeding movement imparted by one oscillation of the ring 70 may be read by comparing the index mark 150 with the graduations 152. As already mentioned, the adjustable stop pin 84 may be set to limit to any selected value, the extent or increment of feeding movement imparted to the spindle by a single oscillation of the ring 70 and its handle 72, and thus to limit the extent of feeding movement imparted by the spindle to the table 38.

The operation of the above described construction is as follows: In order to machine the work piece 44 in accordance with the form of the pattern 46, the two pieces are clamped onto the respective tables 38 and 48 as shown in Fig. 1. The member 37 is placed in its effective position so as to prevent any swinging movement of the arms 16 and 18, so that no horizontal movement of the carriage 24 is possible except, a longitudinal movement back and forth along its track, in the direction of the arrows in Fig. 1. The tables 38 and 48 are properly adjusted in height by the known means, and adjusted horizontally as may be required by means of the cranks 56 and 58, which cranks cause direct movement of the work table 38 and, through the connecting means 50 and 52, corresponding movement of the pattern table 48.

The carriage 24 is now moved in its longitudinal direction to carry the tracing stylus in a straight line over the face of the pattern 46 while the cutting tool 36 correspondingly moves in a straight line over the face of the work 44, as indicated by the first line $a$ in Fig. 1, thus producing a milling of the work in accordance with the characteristics of the pattern. During this movement, the tracing stylus and the cutting tool as well as the entire carriage 24, beam 20, and mounting member 14, are freely movable vertically on the guideway 12, so that the tracing stylus (and with it, the cutting tool) may accommodate any differences in elevation in different parts of the pattern. The vertical working pressure herein is produced by the weight of the parts which are movable along the guide 12; this pressure can be adjusted at will or be completely nullified by devices which are known and therefore not shown.

When the machining along this first line $a$ of the work is finished, it is necessary before machining along the second line $b$ that the work table 38, and with it the pattern table 48, must be fed or shifted through an amount equal to the desired spacing between the machining lines *a* and *b*. This shifting of the tables could be effected by operation of the crank 58 (after disengaging the coupling 120, 100, between the parts 70 and 102, Fig. 3) but if that were done, each individual step of successive shifting movements to successive milling lines would have to be carefully adjusted and controlled by reference to the graduations or scale markings, which is a tedious and time consuming operation, especially if many different steps or feeding increments are required to produce many different milling lines. Moreover, the control of the feeding steps by visual reference to the graduations of scale is difficult of accurate accomplishment by an unskilled operator. In order to avoid this and to enable the fast and easy accomplishment of many different steps or increments of feeding movement, each of exactly uniform extent, it is very advantageous to produce the intermittent advancing motion of the table by means of the handle 72.

Therefore, prior to the beginning of the work the nut 96 is loosened and the stop 84 is shifted within the recess 82 so as to limit the extent of oscillation of the ring 70, between the stop pin 80 on the one hand and the adjustable stop 84 on the other hand, to the angle which is required to obtain the desired advance of the table between successive milling lines such as *a* and *b*. The extent of such advance may be read from the extent of travel of the index mark 150 over the graduated scale 152. The stop 84 is thereupon clamped fast by tightening the nut 96. The direction in which the feeding movements of the table are to take place is, of course, determined in advance, and the feed pawl 120 is accordingly turned one way or the other, as required. In the position shown in Fig. 3, the feeding motion will be imparted to the spindle 62 as the ring 70 and its operating handle 72 move through the clockwise part of each oscillating cycle, whereas if it is desired to feed the table in the opposite direction, the knob 116 is pulled out and turned through 180 degrees so that the feeding movement will occur during the return or counterclockwise part of each complete oscillation of the ring 70 and handle 72.

With this arrangement, as the milling of each successive line is finished, the operator grasps the handle 72 and turns it in a clockwise direction as far as it will go, then returning it backward in a counterclockwise direction to its initial position (or allowing the spring 74 to return it). During the swinging of the handle in one direction or the other, depending on which way the pawl 120 is set to face, the toothed disk 102 will be turned through the previous selected increment, and with it, the feed spindle 62 will be turned through the corresponding amount, with consequent feeding of the work table through the desired step or increment which is intended to take place between successive milling lines. With the movement of the work table, the pattern table 48 will likewise be moved to the same extent by reason of the connection 50, 52 between these two tables. Assuming that it is the rightward or clockwise movement of the handle 72 which feeds the disk 102 forwardly, the return movement of the handle 72 will simply cause the pawl 120 to ratchet idly over the teeth 100 of the disk 102, which disk is prevented from turning in the reverse direction (under the influence of the slight rotary force of reverse movement of the pawl 120) by the friction brake 136.

If for any reason there is unusual resistance to the turning of the spindle 62, the movement of the feeding handle 72 will not break the parts because the driving connection between the disk 102 and the spindle 62 will become disengaged as a result of the unusual resistance, the inclined sides of the notches 110 and 112 forcing the coupling members 104 and 106 radially inwardly against the action of the spring 108.

By thus advancing or feeding the work table through successive increments or steps, in the quick and accurately controlled manner effected by the handle 72, the entire surface of the pattern and the work piece can soon be covered by operating along successive parallel lines at the selected lateral distance from each other. Once the adjustable stop 84 has been properly set, no special skill is required in obtaining uniform feeding increments in the successive feeding steps between successive milling lines.

A modification of the invention is diagrammatically illustrated in Fig. 5, where instead of the connecting member 37 for preventing horizontal movements of the beam 20, such movements are prevented by a connecting member 164 bolted or screwed or otherwise fastened both to the mounting member 14 and to the beam 20. This prevents all horizontal movements of the beam 20 relative to the mounting member 14, so that the carriage 24 can move horizontally only in the longitudinal direction along its guideway on the beam 20.

With this alternative arrangement for blocking the horizontal movements of the beam 20, the same table feeding mechanism is used as above described.

Another modification is shown in Fig. 6. Here, a member 166 is bolted or screwed or otherwise suitably fastened to the mounting member 14 only, the forward end of the member 166 not being fastened to the beam 20 but being in position to have the beam 20 pressed against it. Thus, so long as a rearward component of pressure is exerted against the beam 20 (or against the carriage 24) the beam is maintained in fixed position relative to the mounting member 14 and cannot move horizontally, but the carriage 24 is permitted to move horizontally in its longitudinal direction along its guideway on the beam 20. This stop member 166 can be of a telescopic construction or otherwise adjustable in length, if desired, and may be so mounted on the carriage 14 that it may be swung to an ineffective position when not required. The table feeding mechanism remains the same, when using this stop member 166, as when using the other stop members or holding members 37 or 164 previously mentioned.

Still another modification of the invention is illustrated in Figs. 7 and 8. Here, arrangements are provided for confining the movements of the tracing stylus and the cutting tool to straight lines in directions transverse to the track or guideway of the carriage 24 on the beam 20, instead of in directions parallel to the track or guideway of the carriage 24. For this purpose, a guide rail 168 is detachably secured by bolts or screws or other suitable means to the mounting member 14 and projects forwardly therefrom past the end of the beam 20 and the carriage 24, and has a guide surface extending in a direction transverse to, and preferably perpendicular to, the direction of movement of the carriage 24 on the beam 20. A roller 170 is mounted on a holder 172 secured to the part 26 of the carriage 24. So long as a component of leftward pressure is maintained on the carriage 24, to keep the roller 170 in contact with the guide rail 168, the carriage 24 may be freely moved forwardly and backwardly in the direction of the guide rail 168, so as to mill the work along a line parallel to the direction of the guide rail 168. The milling lines in this case are thus transverse to the length of the carriage 24, and the successive feeding movements between successive milling operations are performed in this instance by the handle 72 on the spindle 60, rather than the corresponding handle on the spindle 62.

Similar feeding spindles, like the spindles 60 and 62, may also be employed, of course, for the pattern table 54, and may be equipped with the same control means of the present invention as described in connection with Figs. 2–4. If this is done, the connection 50, 52 between the work table and the pattern table may be eliminated if desired, and both tables may be fed independently through their own independent feeding spindles, but through the same increments or amounts, by making appropriate settings of the adjustable stop pins 84 of the feed control mechanism of the separate feeding spindles of the separate tables.

It is seen from the foregoing disclosure that the above mentioned objects of the invention are admirably fulfilled. It is to be understood that the foregoing disclosure is given by way of illustrative example only, rather than by way of limitation, and that without departing from the invention, the details may be varied within the scope of the appended claims.

What is claimed is:

1. An engraving and copying machine of the type having a frame, a pattern table and a work table movably mounted on said frame, feeding means for displacing at least one of said tables relative to said frame in the direction of the plane of the table, a guideway, a mounting member mounted for movement along said guideway, a beam, a pair of arms each pivotally connected at one end to said mounting member and each pivotally connected at its other end to said beam to swing about pivotal axes substantially perpendicular to the planes of said tables, said arms and beam together forming a swinging parallelogram for displacement of said beam relative to said frame in certain directions parallel to the planes of the tables, a carriage mounted on the beam for displacement relative thereto in certain other directions parallel to the planes of the tables and at an angle to the directions of displacement of the beam, said arms, said beam, and said carriage all being supported from said mounting member, means on the carriage for holding a tracing stylus and a cutting tool, characterized by means applicable to the mounting member and cooperating with one of the parts supported by said mounting member for preventing motion of the carriage in at least one of the directions parallel to the planes of the tables in which it could otherwise move, and supplementary intermittent feeding means for producing a step by step feeding motion of said tables in the direction in which the motion of said carriage is prevented.

2. A machine as defined in claim 1, in which said means for preventing motion of the carriage in one direction comprises a link rigidly connecting said mounting member to one of said parallelogram arms to hold said arms rigidly against swinging movement about said pivotal axes.

3. A machine as defined in claim 1, in which said means for preventing said motion of the carriage comprises a connecting member connectible to said beam and to said mounting member to prevent motion of said beam in both of two opposite directions transverse to the direction of longitudinal displacement of said carriage relative to said beam.

4. A machine as defined in claim 1, in which said means for preventing said motion of the carriage comprises a member attachable to said mounting member and acting as a stop which prevents motion of said beam in one direction transverse to the direction of longitudinal displacement of said carriage relative to said beam.

5. A machine as defined in claim 1, in which said means for preventing said motion of the carriage comprises a guide member attachable to said mounting member and a cooperating member attachable to said carriage for engagement with said guide member to prevent the longitudinal displacement of said carriage in one direction.

6. A machine as defined in claim 5, in which said guide member is in the form of a rail and in which said cooperating member attachable to the carriage includes a roller supported on the carriage for rolling on said guide rail.

7. A machine as defined in claim 1, in which said feeding means includes a rotary feeding spindle, and in which said supplementary feeding means includes a hand-operated rotary member, spring means tending to turn said rotary member in one direction, adjustable stop means for determining the extent of rotation of said rotary member in the opposite direction, and means engageable and disengageable at will for driving said rotary feeding spindle from either one of the opposite directions of movement of said rotary member.

8. A machine as defined in claim 7, further including disengageable coupling means operatively interposed between said rotary member and said rotary feeding spindle to transfer the driving torque of the former to the latter only up to a predetermined magnitude, said coupling means being automatically disengaged by the exertion of excessive torque from said rotary member against said rotary feeding means.

References Cited in the file of this patent

UNITED STATES PATENTS

| 359,378 | Ballou | Mar. 15, 1887 |
| 511,712 | Ryland | Dec. 26, 1893 |
| 1,972,910 | Zwick | Sept. 11, 1934 |
| 2,034,240 | Kremer et al. | Mar. 17, 1936 |
| 2,178,131 | Zwick | Oct. 31, 1939 |
| 2,213,408 | Pogarch | Sept. 3, 1940 |
| 2,247,462 | Zwich | July 1, 1941 |
| 2,260,157 | Zwich | Oct. 21, 1941 |
| 2,370,882 | Serna | Mar. 6, 1945 |
| 2,371,941 | Zwick | Mar. 20, 1945 |
| 2,384,196 | Rosen | Sept. 4, 1945 |
| 2,386,880 | Osplack | Oct. 16, 1945 |
| 2,525,677 | Holliday | Oct. 10, 1950 |
| 2,540,117 | Hunt | Feb. 6, 1951 |
| 2,572,756 | Plimmer et al. | Oct. 23, 1951 |

FOREIGN PATENTS

| 524,085 | France | Aug. 30, 1921 |